(12) United States Patent
Singh

(10) Patent No.: US 11,273,846 B2
(45) Date of Patent: Mar. 15, 2022

(54) INTERFACE APPARATUS AND METHOD

(71) Applicant: JAGUAR LAND ROVER LIMITED, Coventry (GB)

(72) Inventor: Harpreet Singh, Warwickshire (GB)

(73) Assignee: Jaguar Land Rover Limited, Coventry (GB)

(*) Notice: Subject to any disclaimer, the term of this patent is extended or adjusted under 35 U.S.C. 154(b) by 0 days.

(21) Appl. No.: 16/340,971

(22) PCT Filed: Sep. 12, 2017

(86) PCT No.: PCT/EP2017/072926
§ 371 (c)(1),
(2) Date: Apr. 10, 2019

(87) PCT Pub. No.: WO2018/068967
PCT Pub. Date: Apr. 19, 2018

(65) Prior Publication Data
US 2020/0039433 A1 Feb. 6, 2020

(30) Foreign Application Priority Data
Oct. 11, 2016 (GB) .................................. 1617235

(51) Int. Cl.
*G06K 9/00* (2006.01)
*B60W 50/14* (2020.01)
(Continued)

(52) U.S. Cl.
CPC ............. *B60W 50/14* (2013.01); *B60K 37/06* (2013.01); *B60Q 9/00* (2013.01); *G06K 9/00335* (2013.01);
(Continued)

(58) Field of Classification Search
CPC ........ B60K 2370/167; B60K 2370/158; B60K 2370/73; B60K 2370/741;
(Continued)

(56) References Cited

U.S. PATENT DOCUMENTS 6,181,996 B1 1/2001 Chou et al.
2003/0220725 A1 11/2003 Harter et al.
(Continued)

FOREIGN PATENT DOCUMENTS

DE 102006056444 A1 7/2008
DE 102008061989 A1 6/2010
(Continued)

OTHER PUBLICATIONS

Search and Examination Report, GB 1617235.5, dated Mar. 24, 2017, 7 pp.
(Continued)

*Primary Examiner* — Sean T Motsinger
(74) *Attorney, Agent, or Firm* — McCoy Russell LLP

(57) ABSTRACT

Embodiments of the present invention provide a human-machine interface (HMI) for a vehicle, comprising an output means (40, 50) for outputting information, passenger monitoring means (20) for determining a status of at least one passenger within the vehicle and to outputting a passenger status signal indicative thereof, control means (10) for determining an operating state of one or more systems of the vehicle, wherein the control means (10) is arranged to receive the passenger status signal, and wherein the control means (10) is arranged to compose an output from the output means (40, 50) in dependence on the operating state of the one or more systems and the passenger status signal.

18 Claims, 2 Drawing Sheets

(51) Int. Cl.
  *B60K 37/06* (2006.01)
  *B60Q 9/00* (2006.01)
  *B60K 35/00* (2006.01)

(52) U.S. Cl.
  CPC ..... *G06K 9/00369* (2013.01); *G06K 9/00838* (2013.01); *B60K 35/00* (2013.01); *B60K 2370/157* (2019.05); *B60K 2370/158* (2019.05); *B60K 2370/167* (2019.05); *B60K 2370/186* (2019.05); *B60K 2370/73* (2019.05); *B60K 2370/736* (2019.05); *B60K 2370/741* (2019.05)

(58) Field of Classification Search
  CPC ........ B60K 2370/186; B60K 2370/736; B60K 2370/157; B60K 35/00; B60K 37/06; B60W 50/14–16; B60Q 9/00; G06K 9/00335–00389; G06K 9/00838
  See application file for complete search history.

(56) References Cited

U.S. PATENT DOCUMENTS

| | | | | |
|---|---|---|---|---|
| 2010/0182425 | A1* | 7/2010 | Sakakida | B60N 2/002 348/135 |
| 2011/0295466 | A1* | 12/2011 | Ostu | B60N 2/002 701/45 |
| 2013/0185066 | A1* | 7/2013 | Tzirkel-Hancock | G10L 21/057 704/233 |
| 2015/0125126 | A1 | 5/2015 | Dreuw | |
| 2015/0312404 | A1* | 10/2015 | Abramson | H04M 1/72463 455/418 |
| 2017/0054949 | A1* | 2/2017 | Shaw | G02B 27/0101 |
| 2017/0240185 | A1* | 8/2017 | Li | B60W 40/08 |
| 2017/0328732 | A1* | 11/2017 | Vandanapu | G01C 21/3697 |
| 2018/0065504 | A1* | 3/2018 | Lan | G08B 21/0283 |
| 2018/0194307 | A1* | 7/2018 | Han | B60N 2/56 |
| 2019/0344712 | A1* | 11/2019 | Moffa | B60N 2/688 |
| 2020/0010089 | A1* | 1/2020 | Ford | B60W 20/10 |
| 2020/0017068 | A1* | 1/2020 | Moffa | G07C 5/02 |
| 2020/0039433 | A1* | 2/2020 | Singh | G06K 9/00838 |

FOREIGN PATENT DOCUMENTS

| | | | |
|---|---|---|---|
| DE | 102012023048 | A1 | 5/2014 |
| EP | 2889723 | A1 | 7/2015 |
| JP | 2006121270 | A * | 5/2006 |
| JP | 2009098000 | A | 5/2009 |
| JP | 2009202726 | A | 9/2009 |
| WO | 2014172369 | A1 | 10/2014 |

OTHER PUBLICATIONS

International Search Report and Written Opinion, PCT/EP2017/072926, dated Feb. 1, 2018.

* cited by examiner

INTERFACE APPARATUS AND METHOD

CROSS-REFERENCE TO RELATED APPLICATIONS

This application is a 371 of International Application No. PCT/EP2017/072926, filed Sep. 12, 2017, which claims priority to GB Patent Application 1617235.5, filed Oct. 11, 2016, the contents of both of which are incorporated by reference herein in their entirety.

TECHNICAL FIELD

The present disclosure relates to an interface apparatus and method and particularly, but not exclusively, to an interface apparatus and method for composing information relating to a vehicle. Aspects of the invention relate to human-machine interface, vehicle, human-machine interface method and computer software.

BACKGROUND

Currently it is possible for an occupant of a vehicle, such as a driver of the vehicle, to obtain information relating to one or more systems of the vehicle. It is desired to provide information about the vehicle in a more convenient manner.

It is an object of embodiments of the invention to at least mitigate one or more of the problems of the prior art.

SUMMARY OF THE INVENTION

Aspects and embodiments of the invention provide a human-machine interface (HMI), a vehicle, and a human-machine interface (HMI) method as claimed in the appended claims.

According to an aspect of the invention, there is provided an interface for a vehicle, comprising passenger monitoring means for determining a status of a passenger and control means for composing an output in dependence on the status of the passenger. Advantageously the status of the passenger forms a basis of the output.

According to an aspect of the invention, there is provided a human-machine interface (HMI) for a vehicle, comprising an output means for outputting information, passenger monitoring means for determining a status of at least one passenger within the vehicle and to outputting a passenger status signal indicative thereof, control means for determining an operating state of one or more systems of the vehicle, wherein the control means is arranged to receive the passenger status signal, and wherein the control means is arranged to compose an output from the output means in dependence on the operating state of the one or more systems and the passenger status signal. Advantageously the status of the passenger is taken into account when composing the output.

The human-machine interface as described above, wherein:
- the output means may comprise one or more output devices;
- the passenger monitoring means may comprise a passenger monitoring system; and
- the control means may comprise a control unit.

The output means may comprise two or more of an audible output means, a visual output means and a haptic output means. The control means may be arranged to select from amongst the output means in dependence on the passenger status signal. Advantageously, a plurality of types of output means may be provided and, in some embodiments, a selection is made between the types of output means dependent on the passenger status signal.

The passenger status signal may be indicative of the presence of at least one passenger. Advantageously the presence of any passengers is considered.

Optionally, the passenger status signal is indicative of a number of passengers within the vehicle. Advantageously the number of passengers is considered.

The passenger monitoring means may comprise at least one imaging device arranged to output image data corresponding to at least a portion of an interior of the vehicle. Advantageously image data is used as a sensor. The passenger monitoring means may comprise an image processor arranged to receive the image data, to determine the status of the at least one passenger and to output the passenger status signal in dependence thereon. Advantageously the status of the passenger(s) is determined in a convenient manner.

The image processor is optionally arranged to determine an activity being undertaken by the at least one passenger based on the image data. The passenger status signal may comprise an indication of the activity. Beneficially an activity of the passenger is determined from the image data.

The control means may be arranged to adjust the output to the driver based on the activity being undertaken by the at least one passenger. Advantageously an activity of the passenger is taken into account when composing the output.

The control means may adjust the output to the driver in order to prevent distraction or interruption of the activity being undertaken by the at least one passenger. Advantageously, the passenger may continue their activity uninterrupted.

The adjusting may comprise the control means being adapted to reduce a volume of the output, output a message only visually and/or haptically to the driver; and/or select only output means directed to the driver. Advantageously, the driver may still receive the output without distracting the passenger from their activity.

Optionally the activity is one or more of sleeping, using a communication device, reading, using a computing device, and speaking to another passenger. Advantageously the activity can be one or more of a plurality of types of activity capable of being undertaken in a vehicle.

The image processor may be arranged to determine an importance of the at least one passenger based on the image data and to output the passenger status signal comprising an indication of the determined passenger status. Advantageously the importance of the passenger is considered.

The importance may be selected as one of child or adult. Optionally the importance is determined with respect to a driver of the vehicle. Advantageously, the importance is determined with respect to the driver, where the passenger may be more or less important.

The control means may be arranged to monitor the passenger status signal after composing the output and to re-compose the output in dependence on the passenger status signal indicating a change in the status of the at least one passenger. Advantageously changes in the passenger status are considered.

The control means may be arranged to determine a volume of the output from the audible output means in dependence on the composition of the output. The control means may be arranged to select one or more audio output devices within the vehicle for the composed output. Advantageously the nature of the output is determined.

When said visual output means is selected, the control means may be arranged to select one or more visual output devices within the vehicle for the composed output. Advantageously a location of the output is determined.

Optionally the control means is arranged to cause the output means to output the composed output. The output is beneficially provided.

According to an aspect of the invention, there is provided a vehicle comprising a human-machine-interface according to any of the preceding claims.

According to another aspect of the invention, there is provided a human-machine interface (HMI) method for a vehicle, comprising determining a status of at least one passenger within the vehicle, determining an operating state of one or more systems of the vehicle, composing an output from the HMI in dependence on the operating state of the one or more systems and the status of the at least one passenger.

Optionally the composing the output comprises selecting one or more types of output means in dependence on the determined status of the at least one passenger.

The selecting may comprise selecting from amongst two or more of an audible output means, a visual output means and a haptic output means.

The method may comprise determining a volume of the output from the audible output means in dependence on the composition of the output. The method may comprise selecting from one or more audio output devices within the vehicle for the composed output.

When said visual output means is selected, the method may comprise selecting from one or more visual output devices within the vehicle for the composed output.

Optionally the passenger status signal comprises an indication of the presence of at least one passenger.

The passenger status signal may comprise an indication of a number of passengers within the vehicle.

Determining the status of the at least one passenger optionally comprises determining an activity being undertaken by the at least one passenger.

The output to the driver may be adjusted based on the activity being undertaken by the at least one passenger in order to prevent distraction or interruption of the activity being undertaken by the at least one passenger.

The adjusting of the output may comprise one or more of reducing a volume of the output, outputting a message only visually and/or haptically to the driver; and/or selecting only output means directed to the driver;

The activity may be one or more of sleeping, using a communication device, reading, using a computing device, and speaking to another passenger.

The determining the status of the at least one passenger optionally comprises determining an importance of the at least one passenger; optionally the importance is determined as one of child or adult.

The method may comprise outputting the composed output. Optionally the composed output is output to a driver of the vehicle.

The method may comprise receiving a passenger status signal comprising an indication of the status of the at least one passenger.

The method may comprise receiving image data corresponding to at least a portion of an interior of the vehicle.

The method may comprise processing the image data to determine the status of the at least one passenger.

According to a still further aspect of the invention, there is provided computer software which, when executed by a computer, is arranged to perform a method according to as aspect of the invention. The computer software may be stored on a computer readable medium. Optionally the computer software is tangibly stored on the computer readable medium. The computer readable medium may be non-transitory.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
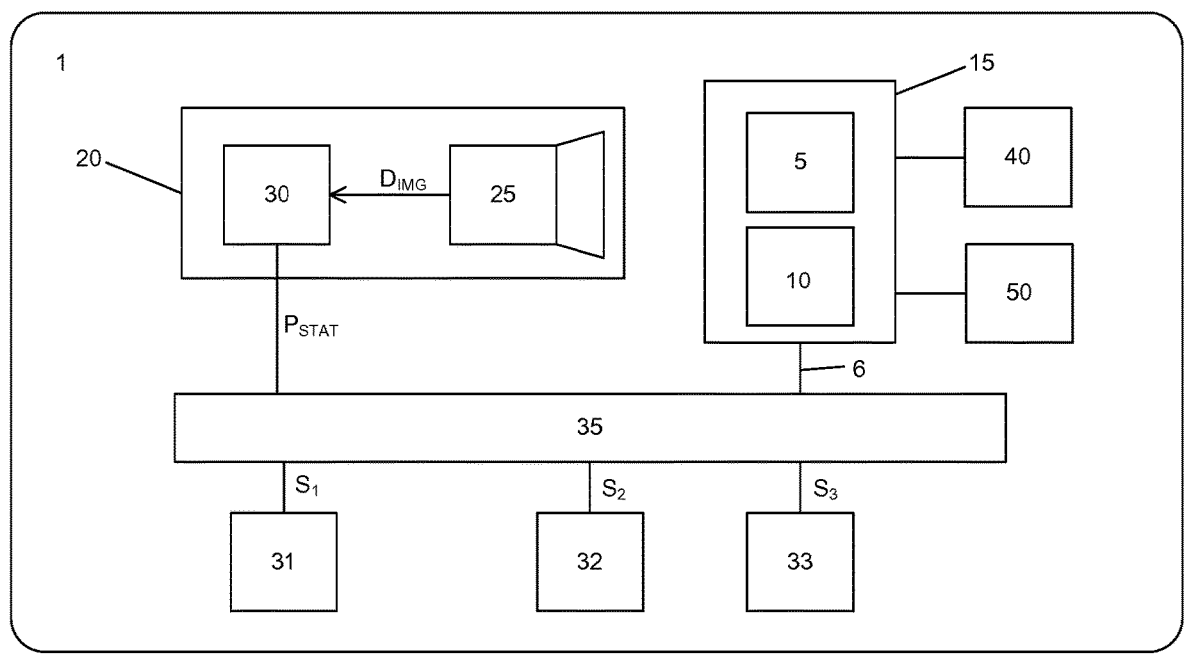
FIG. 1 shows a schematic representation of a vehicle comprising a human-machine interface according to an embodiment of the invention.

FIG. 1 illustrates a control means 10 for configuring one or more systems according to an embodiment of the invention. The control means 10 may be a controller or control unit. In particular, some embodiments of the invention relate to controller 10 for configuring a human-machine interface (HMI) 15. However it will be realised that embodiments of the invention may be envisaged which are not used to configure the HMI 15 and that other systems may be configured by the controller 10, as will be appreciated. The controller 10 is disposed in FIG. 1 in a vehicle 1 such as land-going vehicle. It will be realised that embodiments of the invention are not limited in this respect and that the controller 10 may be useful in other vehicles, such as boats and aircraft.

The controller 10 comprises an electronic processor. The HMI 15 may further comprise a memory such as a memory device 5. A set of computational instructions is stored on the memory device 5 which, when executed by the processor 10 cause the processor to implement a method(s) as described herein. The controller 10 comprises an input, such as an input for receiving electronic data, for receiving data indicative of a presence and status of one or more passengers of the vehicle, as will be explained. The term passenger is used herein to mean an occupant of the vehicle who is not responsible for driving or operating (such as piloting) the vehicle, such as in the case of a land-going vehicle the driver. The passenger may be an occupant of the vehicle seated in a non-driving seat of the vehicle (a seating position not having primary access to vehicular driving controls). In some embodiments, the passenger of the vehicle may be one or more occupants seated in one or more rear seats of the vehicle i.e. $2^{nd}$ or $3^{rd}$ row seats of the vehicle.

The vehicle 1 comprises a passenger monitoring means 20 for determining a status of one or more passengers within the vehicle 1. The passenger monitoring means 20 may be a passenger monitoring system (PMS) 20. The PMS 20 comprises an imaging means 25 which may be in the form of an imaging device or camera 25. The imaging device 25 is configured to output image data ($D_{IMG}$). The image data corresponds to at least a portion of an interior of the vehicle 1. The image data is indicative of a position which at least one passenger may occupy. The imaging device 25 may capture a view of one or more passengers (when present) in the vehicle 1. The image data $D_{IMG}$ may be digital data comprising a representation of an image falling on a sensor, such as a CCD although other sensors may be used, of the imaging device 25. It will also be appreciated that the PMS 20 may comprise other sensing means such as one or more microphones (not illustrated) for outputting audio data $D_{AUD}$ indicative of sounds within the vehicle. The PMS 20 may also receive passenger data indicative of one or more passenger seats being occupied. The passenger data may be received from a seatbelt monitoring system of the vehicle or a seat occupancy sensor, for example.

The image data $D_{IMG}$ is received by a processor 30. The processor 30 may be an image processor 30, although in embodiments of the invention also comprising one or microphones the processor may be an audio-visual (AV) processor 30. It will also be appreciated that a second processor may be provided to process the audio data $D_{AUD}$. The image processing may be an electronic processing device for analysing the image data. The image processor executes software instructions implementing the image analysis. The image processor 30 is configured to analyse the image data to identify, firstly, whether any passengers are present in the vehicle 1 and, secondly, one or more attributes of those passengers. For clarity the vehicle 1 will be described as carrying only one passenger although it will be realised that this is not limiting of embodiments of the invention.

As noted above, the image processor 30 is configured to identify one or more attributes of the passenger of the vehicle. The one or more attributes may comprise a current behaviour of the passenger. The current behaviour may be indicative of an activity being undertaken by the passenger. The activity may be one of sleeping, using a telephone or other communication device, reading, using a computing device such as a laptop computer, tablet or smartphone, speaking to another passenger, although it will be realised that this list is not exhaustive. The activity may be an activity during the undertaking of which the passenger would not want to be disturbed, distracted or interrupted, and such an activity would be flagged as so. A plurality of predetermined categories of passenger activity may be defined, such as comprising those listed above, and the image processor 30 may select a category from the predetermined categories indicative of the activity being undertaken. The image processor 30 may, in some embodiments, determine the activity by analysing the image data to identify, using image recognition, one or more articles such as the telephone or other communication device, a book, tablet or laptop computer in possession of the user. Similarly, sleeping may be identified by a visibility of the passenger's eyes and speaking by an opening and closing of the passenger's mouth or other movement of the mouth.

In some embodiments the attribute may comprise an importance of the passenger. The importance may be an importance level i.e. selected from a plurality of predetermined importance levels. The importance may be indicative of a level of authority of the passenger. The level may be with respect to a driver of the vehicle. For example, a child may be deemed to be less authoritative than the driver, whereas an adult may be deemed to be more authoritative. The level may be defined by one or more rules. Data indicative of the rules may be stored in a memory of, or accessible to, the image processor 30.

The HMI 15 and the PMS 20 are communicatively coupled to a communication bus 35 of the vehicle 1. The communication bus 35 allows information to be exchanged between systems of the vehicle 1. The communication bus may be implemented as a CAN Bus or as an IP-based communication network, such as Ethernet. When using such a bus 35, each system on the bus may represent a network node having an associated ID or address, such as an IP address. Systems may communicate data to specific other systems via specifying one or more IP addresses to receive the data, or may broadcast or publish data to all other systems on the bus 35. It will be realised that other communication protocols may be used for the communication bus 35.

The image processor 30 is configured to output data indicative of whether any passengers are present in the vehicle 1. The image processor 30 may be configured to output data indicative of one or more attributes of those passengers, such as the current behaviour of the passenger. For example, the activity being undertaken by the passenger. The data may be indicative of the importance of the passenger, which may be an importance level selected from a plurality of predetermined levels, such as child and adult.

The data output by the image processor 30 is provided to the communication bus 35, where the communication bus 35 communicates the received data to other systems in the vehicle as described above. The data may be referred to as a passenger status signal ($P_{STAT}$). The passenger status signal may be provided as one or more data packets published onto the communication bus 35.

The HMI 15 is able to receive the passenger status signal from communication bus 35. The HMI 35 may also receive information indicative of one or more other systems 31, 32, 33 of the vehicle 1 via the communication bus. For example, the one or more other systems 31, 32, 33 may comprise at least some of an engine management system, a brake management system, a fuel monitoring system, a tyre pressure monitoring system (TPMS), a vehicle navigation system and a traffic monitoring system. It will be understood that this is a non-exhaustive list of vehicle systems VS suitable for use in conjunction with the HMI described herein. The vehicle systems publish data signals $S_1$, $S_2$, $S_3$ . . . to the communication bus 35. The data signals $S_1$, $S_2$, $S_3$ . . . may each comprise one or more data packets relating to the operating state of the corresponding vehicle system. Each system may publish a data signals $S_1$, $S_2$, $S_3$ . . . to the communication bus 35 when an operational state of the system changes. In some embodiments each signal is associated with a priority level, thereby allowing a selection of signals to be performed by the HMI 15 i.e. only selecting signals having greater than a predetermined priority, such as warning messages.

The controller 10 is arranged to compose an output from the output means in dependence on the operating state of the one or more systems 31, 32, 33 and the passenger status signal $P_{STAT}$. The controller 10 is, in some embodiments, configured to select from amongst a plurality of types of output means available within the vehicle 1 in dependence on the status of the at least one passenger i.e. based on the passenger status signal P STAT. In some embodiments the controller 10 is arranged to configure one or more outputs in dependence on the status of the at least one passenger, as will be explained.

The HMI 15 is coupled to one or more output means in the form of output devices 40, 50. The output means are for outputting information to one or more occupants of the vehicle. In some embodiments, the output means are directed to the driver of the vehicle 1. For example, at least one of the output means may be a display screen arranged to be viewable by the driver, such as mounted upon or with in a dashboard of the vehicle or forming a head-up display (HUD) of the vehicle 1. The vehicle 1 may comprise a plurality of display screens each viewable by some of the occupants of the vehicle 1. For example, each rear seat passenger may be provided with a respective display screen in addition to one or more display screens viewable by the driver. The controller 10 is arranged to select from amongst a plurality of visual output devices within the vehicle 1 according to the passenger status signal.

At least one of the output means may comprise an audio system of the vehicle wherein audio output within the vehicle may be heard by a plurality of occupants of the vehicle 1 i.e. not just the driver but also passengers of the vehicle 1. The output means may comprise one or more of audible output means, visual output means and haptic output means. The controller 10 is arranged to select from amongst the output means according to the passenger status signal.

It has been appreciated that, particularly in some types of vehicle 1, it is desired not to disturb or interrupt passengers of the vehicle 1. For example, in a vehicle used as a chauffeur driven vehicle it is desired not to interrupt one or more passengers in rear seats or in seating rows behind the driver's seat, such as $2^{nd}$ and $3^{rd}$ row seats. It may also be desired, particularly, not to interrupt passengers in conversation, reading, sleeping, or using communication devices such as telephones or video communication devices. It will be appreciated that such considerations apply not just to chauffeur driven vehicles, but to all types of vehicle. Embodiments of the invention ameliorate this problem by configuring an output of the HMI 15 according to the status of the at least one passenger within the vehicle 1.

FIG. 1 illustrates, by way of example, the HMI 15 coupled to an audio output device 40 and a display screen 50. It will be appreciated that whilst only two output devices 40, 50 are illustrated that embodiments of the present invention are not limited in this respect. For example, the HMI may be coupled to a plurality of display screens, audio output devices, such as speakers, and one or more haptic output devices for providing a physical sensory output.

Figure 2:
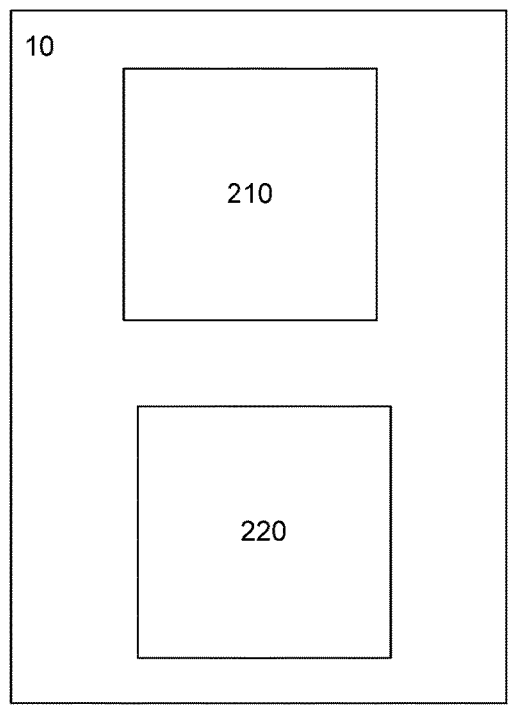
FIG. 2 is a schematic illustration of modules of a controller according to an embodiment of the invention.

FIG. 2 schematically illustrates modules which may be operatively executed by the controller 10 of the HMI 15. It will be appreciated that the controller 10 may implement other modules besides those illustrated. In some embodiments the controller 10 executes an output selection module 210. In some embodiments the controller 10 executes an output composition module 220.

The output selection module 210 is arranged to select one or more output means 40, 50 within the vehicle. The output selection module 210 is arranged to receive the passenger status signal $P_{STAT}$ and to select one or more output means 40, 50 within the vehicle 1 based thereon. The output selection module 210 may select the one or more output means 40, 50 for providing an output in order to avoid interrupting, disturbing, or distracting of the passenger(s) within the vehicle, whilst providing the output to the driver of the vehicle 1. For example, if it is determined that a passenger is talking, either to another passenger or on the telephone, if it is determined that a passenger is sleeping, or if it is determined that a passenger is reading, the output selection module 210 may enact one or more of:

1.) Reduce a volume of output information;
2.) Select output means, such as one or more driver side speaker(s) only for information
3.) Output a message only visually and/or haptically to the driver.
4.) Select only audio device(s) such as speaker(s) and/or only display screen(s), or devices such as the HUD, directed to the driver.

The output selection module 210 may choose which option to enact based on the determination of the passenger's status. For example, reducing the volume of output information or selecting only device(s) directed to the driver may be the most appropriate option when it is determined that the passenger is on the phone, while outputting a message only visually and/or haptically to the driver may be the most appropriate option if it determined that one or more of the passengers are sleeping.

The output composition module 220 is arranged to compose the information to be output in dependence on the one or more data signals $S_1, S_2, S_3 \ldots$ from one or more of the vehicle systems 31, 32, 33. As noted above, the data signals $S_1, S_2, S_3 \ldots$ provide information relating to the operating state of the corresponding vehicle system 31, 32, 33. The output composition module 220 controls the output of information from the HMI 15, for example to control one or both of a timing at which a message or notification is output and a content of the message. For example, the output composition module 220 may compose the message or notification by selecting from images to be displayed such as graphics or icons and/or words or phrases for display or generation as audible speech.

Figure 3:
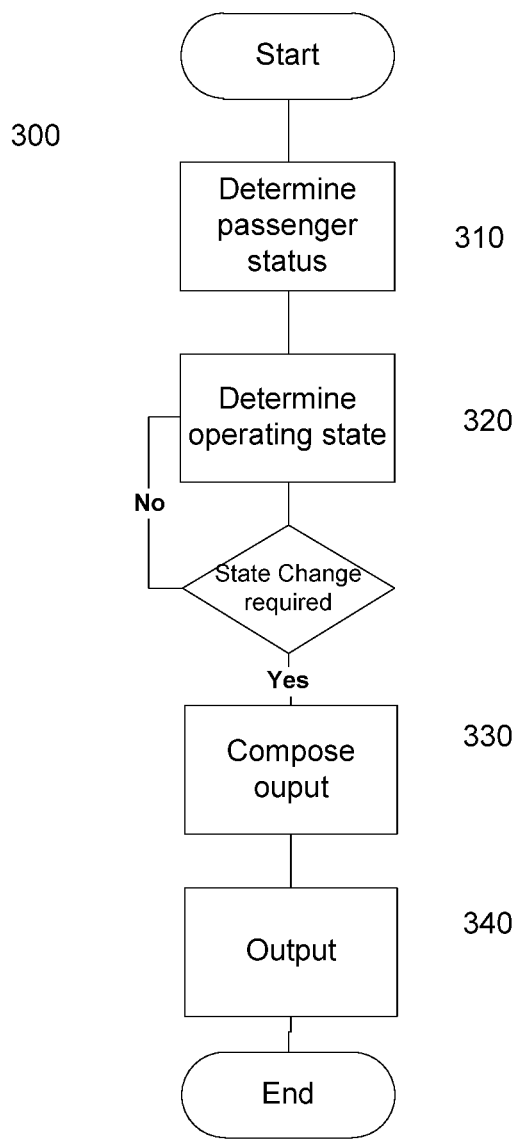
FIG. 3 is a flowchart illustrating a method according to an embodiment of the invention.

FIG. 3 illustrates a human-machine interface (HMI) method 300 according to an embodiment of the invention.

The method 300 comprises a step 310 of determining a status of at least one passenger within the vehicle. In step 310 the HMI 15 may receive the passenger status signal $P_{STAT}$.

The method 300 comprises a step 320 of determining an operating state of one or more systems of the vehicle. In step 320 the HMI 15 may receive the one or more data signals $S_1$, $S_2$, $S_3$ indicative of the state of one or more systems of the vehicle 1.

The method 300 comprises a step 330 of composing an output from the HMI in dependence on the status of the at least one passenger. Step 330 may comprise the output selection module 210 selecting one or more output devices according to the status signal. Step 330 may comprise the output composition module 220 composing the message or notification to be output based on the one or more data signals $S_1$, $S_2$, $S_3$. For example, the message may be indicative of an instruction from the satellite navigation system of the vehicle, or the TPMS.

In step 340 the output is provided from the HMI 15. Step 340 comprises the HMI causing one or more output devices 40, 50 within the vehicle to operate to output the message or notification. For example, in step 340 the controller 10 instructs one or more audio devices to output the composed message.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A human-machine interface (HMI) for a vehicle, comprising:
    at least one output device for outputting information;
    a passenger monitoring system for determining a status of at least one passenger within the vehicle and outputting a passenger status signal indicative thereof, the passenger monitoring system comprising:
        at least one imaging device arranged to output image data corresponding to at least a portion of an interior of the vehicle, and
        an image processor arranged to receive the image data, to determine the status of the at least one passenger, and to output the passenger status signal based thereon; and
    a controller comprising an electronic processor for determining an operating state of one or more systems of the vehicle, wherein the controller is arranged to receive the passenger status signal;
    wherein the controller is further arranged to compose an output from the output means based on the operating state of the one or more systems and the passenger status signal;
    wherein the image processor is further arranged to determine an activity being undertaken by the at least one passenger based on the image data and to output the passenger status signal comprising an indication of the activity;
    wherein the image processor is arranged to determine the activity being undertaken by the at least one passenger by analyzing the image data to identify, using image recognition, one or more articles in possession of the at least one passenger; and
    wherein the controller is further arranged to compose the output to a driver based on the activity being undertaken by the at least one passenger in order to prevent distraction or interruption of the activity being undertaken by the at least one passenger.

2. The (HMI) of claim 1, wherein the at least one output device comprises two or more of the following: one or more audible output devices, one or more visual output devices, and one or more haptic output devices, and further wherein the controller is arranged to select from amongst the output devices based on the passenger status signal.

3. The HMI of claim 1, wherein the passenger status signal is indicative of one or both of the presence of at least one passenger and a number of passengers within the vehicle.

4. The HMI of claim 2, wherein the controller is adapted to:
    reduce a volume of the output;
    output a message only visually and/or haptically to the driver; and
    select only an output device directed to the driver.

5. The HMI of claim 1 wherein the activity is one or more of the following: sleeping, using a communication device, reading, using a computing device, and speaking to another passenger.

6. The HMI of claim 1, wherein the image processor is arranged to determine an importance of the at least one passenger based on the image data and to output the passenger status signal comprising an indication of the determined passenger status.

7. The HMI of claim 1, wherein the controller is further arranged to monitor the passenger status signal after composing the output and to re-compose the output in dependence on the passenger status signal indicating a change in the status of the at least one passenger.

8. The HMI of claim 1, wherein the controller is further arranged to cause the output device to output the composed output.

9. A vehicle comprising the HMI of claim 1.

10. A human-machine interface (HMI) method for a vehicle, comprising:
    receiving image data corresponding to at least a portion of an interior of the vehicle;
    processing the image data to determine a status of at least one passenger within the vehicle;
    determining an operating state of one or more systems of the vehicle; and
    composing an output from the HMI in dependence on the operating state of the one or more systems and the status of the at least one passenger;
    wherein determining the status of the at least one passenger comprises determining an activity being undertaken by the at least one passenger by analyzing the image data to identify, using image recognition, one or more articles in possession of the at least one passenger; and
    wherein the output to a driver is composed based on the activity being undertaken by the at least one passenger in order to prevent distraction or interruption of the activity being undertaken by the at least one passenger.

11. The method of claim 10, wherein composing the output comprises selecting one or more types of output devices based on the determined status of the at least one passenger, and wherein the selecting comprises selecting from amongst two or more of the following: one or more audible output devices, one or more visual output devices, and one or more haptic output devices.

12. The method of claim 10, wherein the passenger status signal comprises one or both of an indication of the presence of at least one passenger and a number of passengers within the vehicle.

13. The method of claim 10, wherein adjusting the output comprises one or more of the following:
   reducing a volume of the output;
   outputting a message only visually and/or haptically to the driver; and
   selecting only output devices directed to the driver.

14. The method of claim 10, wherein the activity is one or more of the following: sleeping, using a communication device, reading, using a computing device, and speaking to another passenger.

15. The method of claim 10, wherein determining the status of the at least one passenger comprises determining an importance of the at least one passenger.

16. The method of claim 10, further comprising outputting the composed output.

17. The method of claim 10, further comprising receiving a passenger status signal comprising an indication of the status of the at least one passenger.

18. A tangible, non-transitory computer-readable medium storing instructions which, when executed by a computer, perform a method according to claim 10.

* * * * *